United States Patent
Brobston et al.

(10) Patent No.: US 8,180,312 B2
(45) Date of Patent: *May 15, 2012

(54) RECEIVER ARCHITECTURE FOR MINIMIZING USE OF EXTERNAL BANDPASS FILTER BETWEEN LOW-NOISE AMPLIFIER AND FIRST MIXER

(75) Inventors: Michael L. Brobston, Allen, TX (US); Seong Eun Kim, Plano, TX (US); Lup M. Loh, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1009 days.

This patent is subject to a terminal disclaimer.

(21) Appl. No.: 11/590,397

(22) Filed: Oct. 31, 2006

(65) Prior Publication Data

US 2007/0042738 A1    Feb. 22, 2007

Related U.S. Application Data

(63) Continuation-in-part of application No. 11/197,017, filed on Aug. 4, 2005, now Pat. No. 7,463,875.

(51) Int. Cl.
*H04B 1/26* (2006.01)

(52) U.S. Cl. ............ 455/324; 455/232.1; 455/323; 455/314; 455/255

(58) Field of Classification Search .......... 455/324, 455/232.1, 323, 314, 255
See application file for complete search history.

(56) References Cited

U.S. PATENT DOCUMENTS

| | | | | |
|---|---|---|---|---|
| 6,125,269 | A * | 9/2000 | Brekelmans | 455/180.1 |
| 6,636,181 | B2 * | 10/2003 | Asano et al. | 343/702 |
| 6,658,237 | B1 * | 12/2003 | Rozenblit et al. | 455/83 |
| 6,965,656 | B2 * | 11/2005 | Koizumi | 375/345 |
| 7,076,231 | B2 * | 7/2006 | Yamawaki et al. | 455/323 |
| 7,463,875 | B2 * | 12/2008 | Brobston et al. | 455/324 |
| 7,924,944 | B2 * | 4/2011 | Vassiliou et al. | 375/316 |
| 2003/0139147 | A1 * | 7/2003 | Shi | 455/82 |
| 2004/0137853 | A1 * | 7/2004 | Tanaka et al. | 455/73 |
| 2009/0135781 | A1 * | 5/2009 | Vaisanen et al. | 370/330 |

* cited by examiner

*Primary Examiner* — Sanh Phu (57) ABSTRACT

A wireless receiver is provided that includes a multi-step gain-control low-noise amplifier (LNA) stage and a mixer stage. The LNA stage is operable to amplify at least one input signal to generate at least one LNA output. The mixer stage is directly coupled to the LNA stage (without an intervening external bandpass filter) and is operable to down-convert the LNA output to generate a mixer output.

25 Claims, 5 Drawing Sheets

RECEIVER ARCHITECTURE FOR MINIMIZING USE OF EXTERNAL BANDPASS FILTER BETWEEN LOW-NOISE AMPLIFIER AND FIRST MIXER

CROSS-REFERENCE TO RELATED APPLICATION AND CLAIM OF PRIORITY

The present application is a continuation-in-part of U.S. patent application Ser. No. 11/197,017, titled "Wireless Device Minimizing Use of External Bandpass Filter Between Low-Noise Amplifier and First Mixer," filed on Aug. 4, 2005 now U.S. Pat. No. 7,463,875. Application Ser. No. 11/197,017 is assigned to the assignee of the present application and is hereby incorporated by reference into the present application as if fully set forth herein. The present application hereby claims priority under 35 U.S.C. §120 to U.S. patent application Ser. No. 11/197,017.

TECHNICAL FIELD OF THE INVENTION

The present invention relates generally to wireless receivers and, more specifically, to a receiver architecture that minimizes the use of an external bandpass filter between a low-noise amplifier and a first mixer.

BACKGROUND OF THE INVENTION

Conventional designs for WCDMA receivers in handsets or local area base stations that meet the 3GPP TS25.101 standard include an external inter-stage filter between the low-noise amplifier (LNA) and the mixer for Class I through Class VI devices. These designs for WCDMA handset and base station receivers become unattractive in multi-band applications due to numerous external filter requirements and complex ASIC pin-outs. More external components also require additional printed circuit board (PCB) space. In addition, the use of higher external component count reduces flexibility and configurability of the receiver.

Recently, a receiver architecture was designed that allowed a WCDMA receiver to meet the 3GPP TS25.101 standard without the use of an external inter-stage filter between the LNA and the mixer, as described in U.S. patent application Ser. No. 11/197,017 incorporated by reference above. This receiver architecture uses a three-step gain LNA and a mixer without an intervening external filter.

SUMMARY OF THE INVENTION

A wireless receiver is provided that includes a multi-step gain-control low-noise amplifier (LNA) stage and a mixer stage. According to an advantageous embodiment of the present disclosure, the LNA stage is operable to amplify at least one input signal to generate at least one LNA output. The mixer stage is directly coupled to the LNA stage (without an intervening external bandpass filter) and is operable to down-convert the LNA output to generate a mixer output.

According to another embodiment of the present disclosure, a mobile station for use in a wireless network is provided that includes a transceiver and a receive processing circuit. The transceiver includes a multi-step gain-control low-noise amplifier (LNA) stage and a mixer stage. The LNA stage is operable to amplify at least one input signal to generate at least one LNA output. The mixer stage is directly coupled to the LNA stage and is operable to down-convert the LNA output to generate a mixer output. The transceiver is operable to generate a transceiver output based on the mixer output. The receive processing circuit is coupled to the transceiver and is operable to process the transceiver output to generate a processed baseband signal for a speaker of the mobile station.

According to yet another embodiment of the present disclosure, a base station for use in a wireless network is provided that includes a transceiver. The transceiver includes a multi-step gain-control low-noise amplifier (LNA) stage and a mixer stage. The LNA stage is operable to amplify at least one input signal to generate at least one LNA output. The mixer stage is directly coupled to the LNA stage and is operable to down-convert the LNA output to generate a mixer output.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged receiver.

Figure 1:
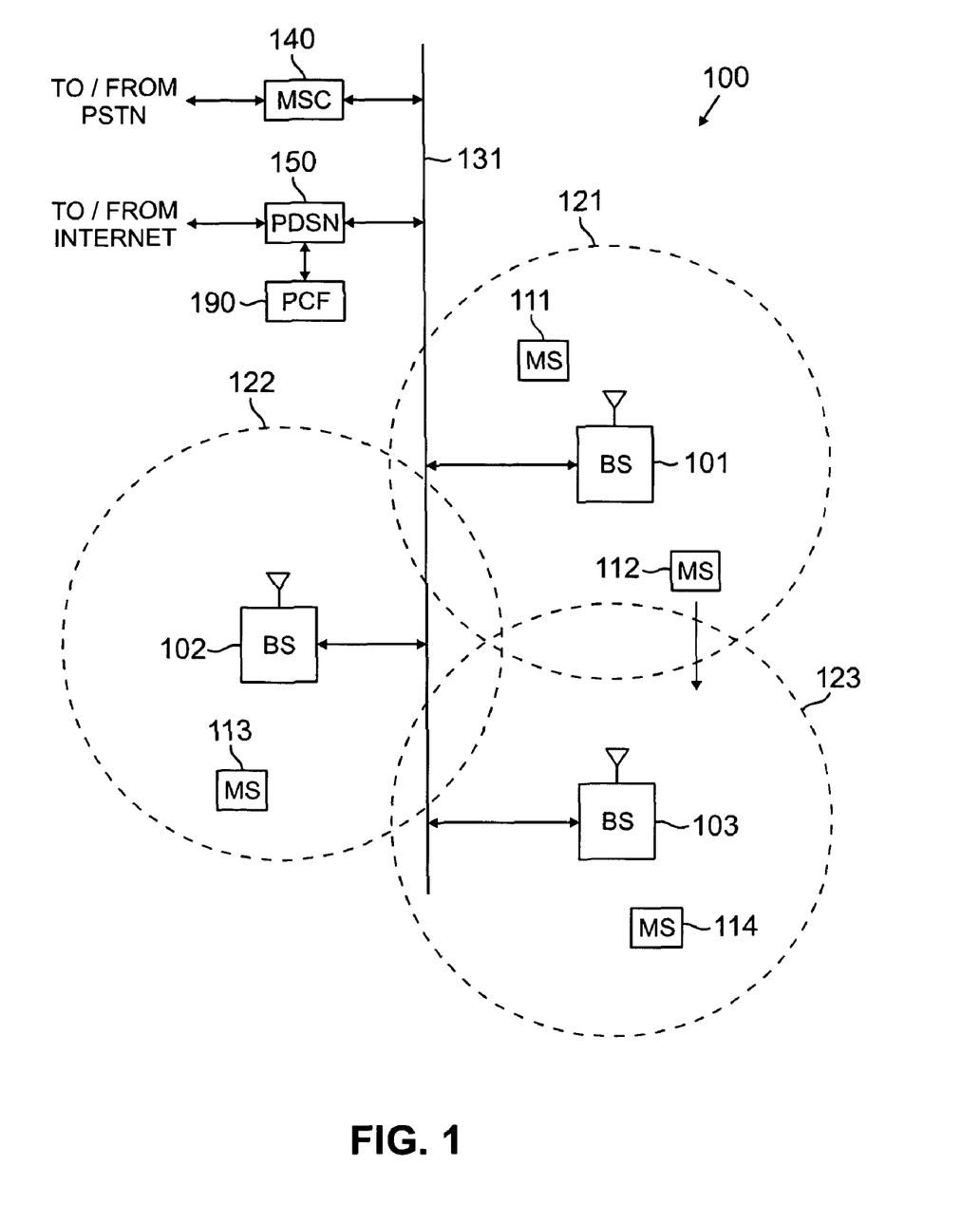
FIG. 1 illustrates a wireless network including base stations and mobile stations having receivers that are capable of minimizing the use of an external bandpass filter between a low-noise amplifier (LNA) and a first mixer according to one embodiment of the disclosure.

FIG. 1 illustrates a wireless network 100 that includes base stations and mobile stations with receivers that are capable of minimizing the use of an external bandpass filter between a low-noise amplifier (LNA) and a first mixer according to the principles of the present disclosure.

Wireless network 100 comprises a plurality of cells (or cell sites) 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In wireless network 100, MS 111 is located in cell 121 and is in communication with BS 101. MS 112 is also located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

In accordance with one embodiment of the present disclosure, one or more of base stations 101-103 and/or one or more of mobile stations 111-114 comprises a receiver that is capable of minimizing the use of an external bandpass filter between a low-noise amplifier (LNA) stage and a first mixer stage in the receiver. As described in more detail below in connection with FIG. 4, each such receiver may comprise any suitable number of LNAs in the LNA stage and any suitable number of mixers in the mixer stage.

Figure 2:
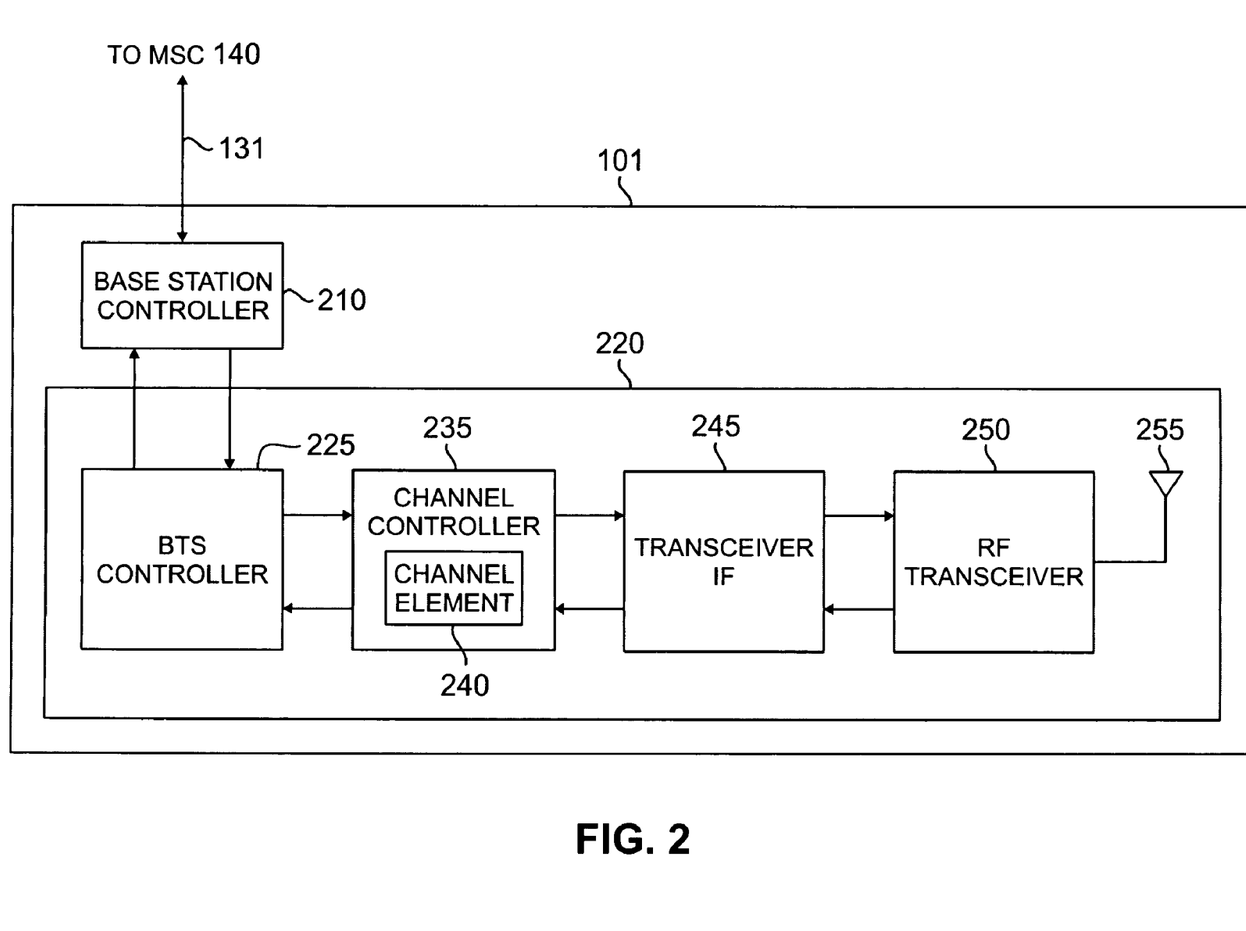
FIG. 2 is a block diagram of a base station having a transceiver that is capable of minimizing the use of an external bandpass filter between an LNA and a first mixer according to one embodiment of the disclosure.

FIG. 2 illustrates base station 101 in greater detail according to one embodiment of the present disclosure. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235 (which contains representative channel element 240), transceiver interface (IF) 245, RF transceiver 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 235 and RF transceiver 250.

Antenna array 255 transmits forward channel signals received from RF transceiver 250 to mobile stations in the coverage area of BS 101. Antenna array 255 also sends to RF transceiver 250 reverse channel signals received from mobile stations in the coverage area of BS 101. In a preferred embodiment of the present disclosure, antenna array 255 is multi-sector antenna, such as a three-sector antenna in which each antenna sector is responsible for transmitting and receiving in a 120 degree arc of coverage area. Additionally, RF transceiver 250 may contain an antenna selection unit to select among different antennas in antenna array 255 during both transmit and receive operations.

In accordance with one embodiment of the present disclosure, RF transceiver 250 may comprise a receiver architecture that is capable of minimizing the use of an external bandpass filter between a low-noise amplifier (LNA) stage and a first mixer stage in RF transceiver 250. As described in more detail below in connection with FIG. 4, the receiver architecture may provide for any suitable number of LNAs in the LNA stage and any suitable number of mixers in the mixer stage.

Figure 3:
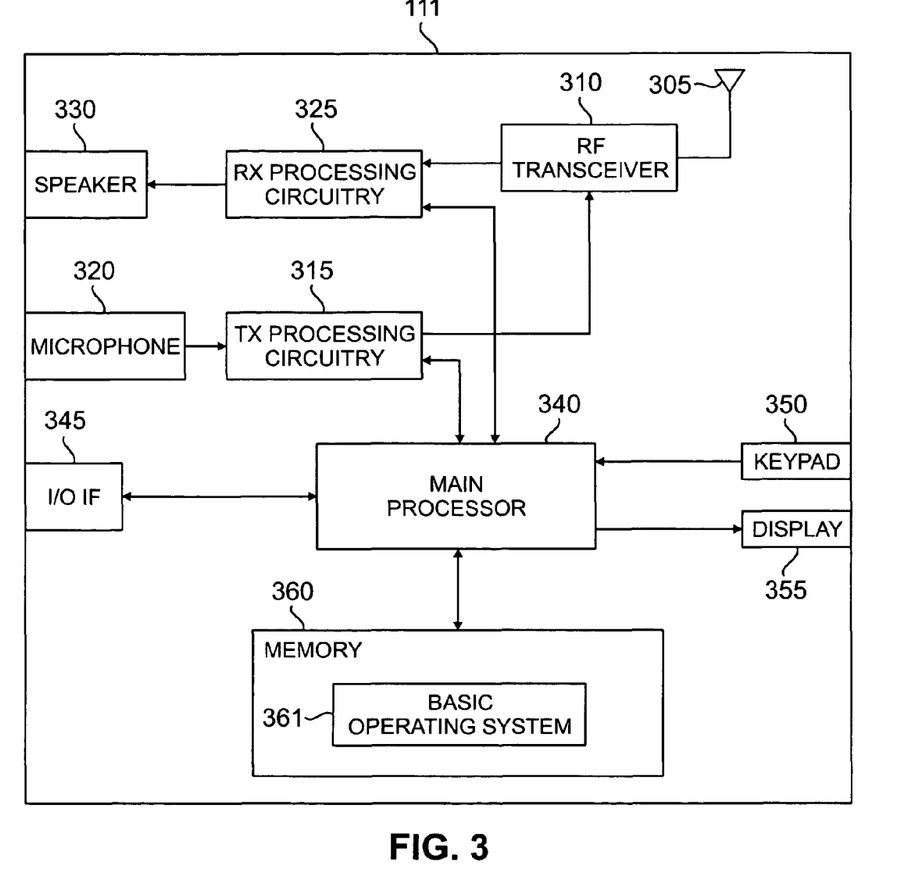
FIG. 3 is a block diagram of a mobile station having a transceiver that is capable of minimizing the use of an external bandpass filter between an LNA and a first mixer according to one embodiment of the disclosure.

FIG. 3 illustrates wireless mobile station 111 according to an advantageous embodiment of the present disclosure. Wireless mobile station 111 comprises antenna 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system program 361.

RF transceiver 310 receives from antenna 305 an incoming RF signal transmitted by a base station of wireless network 100. RF transceiver 310 down-converts the incoming RF signal to produce an intermediate frequency (IF) or a baseband signal. The IF or baseband signal is sent to receive processing circuitry 325, which produces a processed baseband signal by filtering, digitizing the baseband or IF signal, additional filtering, if necessary, demodulation and/or decoding. Receive processing circuitry 325 transmits the processed baseband signal to speaker 330 (i.e., voice data) or to main processor 340 for further processing (e.g., web browsing).

Transmit processing circuitry 315 receives analog or digital voice data from microphone 320 or other outgoing baseband data (e.g., web data, e-mail, interactive video game data) from main processor 340. Transmit processing circuitry 315 encodes, modulates, multiplexes, and/or digitizes the outgoing baseband data to produce a processed baseband or IF signal. RF transceiver 310 receives the outgoing processed baseband or IF signal from transmit processing circuitry 315. RF transceiver 310 up-converts the baseband or IF signal to a radio frequency signal that is transmitted via antenna 305.

In accordance with one embodiment of the present disclosure, RF transceiver 310 may comprise a receiver architecture that is capable of minimizing the use of an external bandpass filter between a low-noise amplifier (LNA) stage and a first mixer stage in RF transceiver 310. As described in more detail below in connection with FIG. 4, RF transceiver 310 may comprise any suitable number of LNAs in the LNA stage and any suitable number of mixers in the mixer stage.

Main processor 340 executes basic operating system program 361 stored in memory 360 in order to control the overall operation of wireless mobile station 111. In one such operation, main processor 340 controls the reception of forward channel signals and the transmission of reverse channel signals by RF transceiver 310, receive processing circuitry 325, and transmit processing circuitry 315, in accordance with well-known principles.

Main processor 340 is capable of executing other processes and programs resident in memory 360. Main processor 340 can move data into or out of memory 360, as required by an executing process. Main processor 340 is also coupled to I/O interface 345. I/O interface 345 provides mobile station 111 with the ability to connect to other devices such as laptop computers and handheld computers. I/O interface 345 is the communication path between these accessories and main controller 340.

Main processor 340 is also coupled to keypad 350 and display unit 355. The operator of mobile station 111 uses keypad 350 to enter data into mobile station 111. Display 355 may be a liquid crystal display capable of rendering text and/or at least limited graphics from web sites. Alternate embodiments may use other types of displays.

Figure 4:
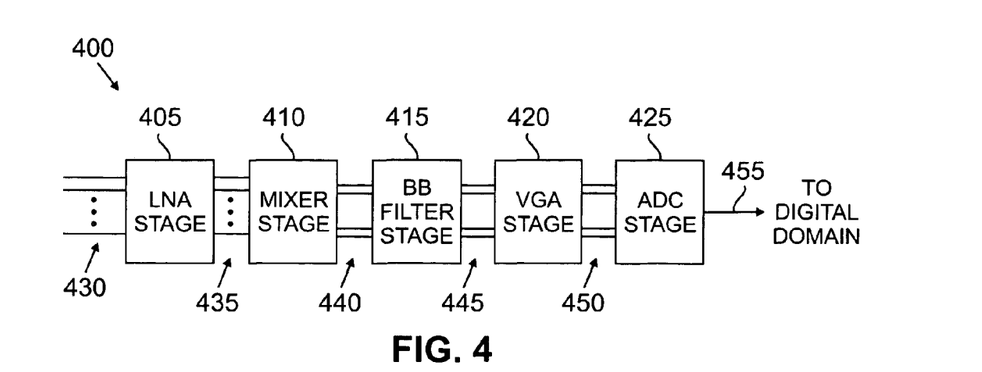
FIG. 4 is a block diagram of a receiver that minimizes the use of an external bandpass filter between an LNA and a first mixer, such as the transceiver of FIG. 2 or 3, according to one embodiment of the disclosure.

FIG. 4 is a block diagram of a receiver 400 that minimizes the use of an external bandpass filter between a low-noise amplifier (LNA) and a first mixer according to one embodiment of the disclosure. Receiver 400 may be implemented in RF transceiver 250, as shown in base station 101 of FIG. 2, in RF transceiver 310, as shown in mobile station 111 of FIG. 3, or in any other suitable wireless device. Receiver 400 comprises a wideband CDMA (WCDMA) receiver without an external inter-stage RF-SAW filter for each band. In addition, receiver 400 meets the 3GPP TS25.101 requirements for a full division duplex (FDD) WCDMA receiver in Class I through Class VI.

Receiver 400 comprises an LNA stage 405, a mixer stage 410, a baseband (BB) filter stage 415, a variable gain amplifier (VGA) stage 420, and an analog-to-digital converter (ADC) stage 425. It will be understood that receiver 400 may comprise any other suitable components. For example, a digital domain (not shown in FIG. 4) may include digital components of receiver 400. Also, the analog domain illustrated in FIG. 4 may comprise additional components.

In accordance with the present disclosure, LNA stage 405 comprises a multi-step gain control that is operable to receive at least one of multiple inputs 430 and to generate an LNA output 435 based on each received input 430. Thus, LNA stage 405 may comprise two or more LNAs, with each LNA configured to amplify a different band of input signals 430.

Mixer stage 410 comprises one or more mixers and is operable to generate multiple mixer outputs 440 based on the LNA outputs 435. Mixer stage 410 is directly coupled to LNA stage 405. As used herein, "directly coupled" means that no external bandpass filter is coupled between the stages 405 and 410 so that the LNA outputs 435 are not filtered by an external bandpass filter before being provided to mixer stage 410. Mixer stage 410 comprises a relatively high input third order intercept point (IP3) and a relatively high input second order intercept point (IP2). For example, for one embodiment, the input IP3 for mixer stage 410 may comprise approximately 7 dBm and the input IP2 for mixer stage 410 may comprise approximately 70 dBm (at input differential impedance of 200Ω for a direct-conversion I/Q mixer).

Baseband filter stage 415 comprises one or more baseband filters and is operable to generate filtered outputs 445 based on the mixer outputs 440. VGA stage 420 comprises one or more VGAs and is operable to generate amplifier outputs 450 based on the filtered outputs 445. Each VGA of VGA stage 420 comprises a low maximum gain, limited dynamic range analog VGA. For example, for one embodiment, each VGA may provide up to 10 dB power gain with a dynamic range of approximately 25 dB. Finally, ADC stage 425 comprises one or more ADCs and is operable to generate one or more digital outputs 455 based on the amplifier outputs 450 for the digital domain of receiver 400. For one embodiment, ADC stage 425 comprises sigma-delta ADCs.

In operation, according to one embodiment, LNA stage 405 receives at least one of multiple inputs 430, such as a low-band, mid-band and/or high-band input, and provides low-noise amplification for each input 430 to generate one of the LNA outputs 435. Mixer stage 410 receives the LNA outputs 435 directly from LNA stage 405 and down-converts the LNA outputs 435 to generate two quadrature baseband analog signals, I and Q, as the mixer outputs 440. These signals may be single-ended or differential. Baseband filter stage 415 provides baseband filtering on the mixer outputs 440 to generate the filtered I and Q outputs 445. VGA stage 420 amplifies or attenuates the filtered I and Q outputs 445 to generate amplifier outputs 450. ADC stage 425 converts the amplifier outputs 450 from analog signals into two digital output signals 455.

Thus, by implementing a receiver 400 with an LNA stage 405 that uses a multi-step gain control, a mixer stage 410 with a relatively high input IP3 and a relatively high input IP2, a baseband filter stage 415 after the mixer stage 410, and a low maximum gain, limited dynamic range analog VGA stage 420 before the ADC stage 425, an external inter-stage filter that is conventionally included in a receiver between an LNA and a first mixer of the receiver may be eliminated.

Figure 5:
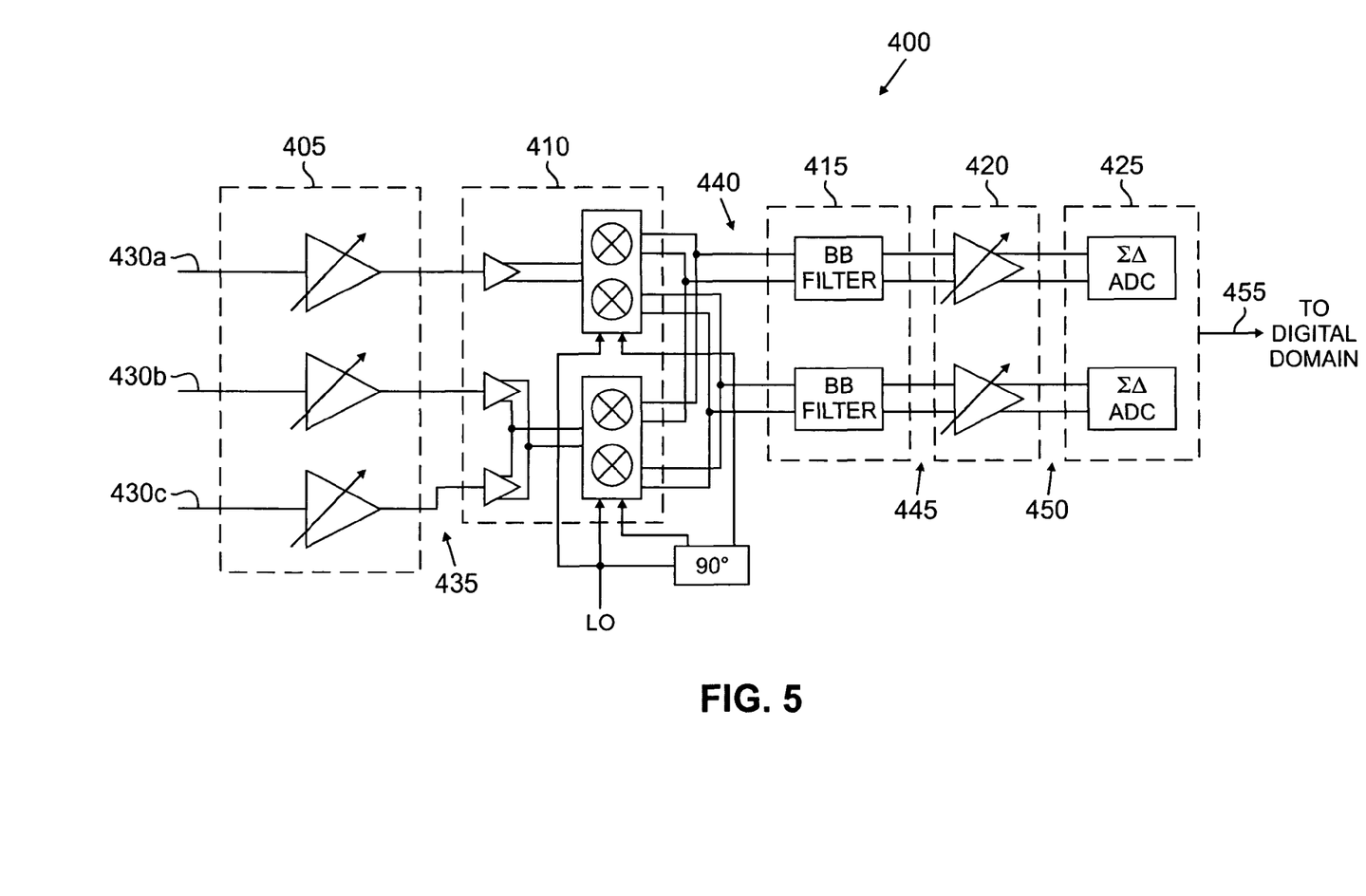
FIG. 5 illustrates details of the receiver of FIG. 4 according to one particular embodiment of the disclosure.

FIG. 5 illustrates details of receiver 400 according to one particular embodiment of the disclosure. For this particular embodiment, LNA stage 405 of receiver 400 comprises a 3-step gain control stage of three LNAs and mixer stage 410 comprises two sets of mixers with a transconductance gain stage comprising three separate gain buffers (one gain buffer for each LNA in LNA stage 405). In addition, baseband filter stage 415 comprises two baseband filters, VGA stage 420 comprises two VGAs, and ADC stage 425 comprises two sigma-delta ADCs. The receiver 400 of FIG. 5 may be implemented in RF transceiver 250, as shown in base station 101 of FIG. 2, in RF transceiver 310, as shown in mobile station 111 of FIG. 3, or in any other suitable wireless device.

For this embodiment of LNA stage 405, the first LNA is configured to amplify low-band input signals 430a, the second LNA is configured to amplify mid-band input signals 430b, and the third LNA is configured to amplify high-band input signals 430c. For this embodiment of mixer stage 410, the first mixer set is operable to mix the low-band LNA output 435 generated by the first LNA, and the second mixer set is operable to mix either the mid-band LNA output 435 generated by the second LNA or the high-band LNA output 435 generated by the third LNA. It will be understood that the functionality of the two sets of mixers of mixer stage 410 may be otherwise divided without departing from the scope of the present disclosure. For example, one mixer may be operable to mix the low band or the mid band, while the other mixer may be operable to mix the high band.

In operation, for the embodiment illustrated in FIG. 5, LNA stage 405 receives a low-band input 430a at the first LNA, a mid-band input 430b at the second LNA and/or a high-band input 430c at the third LNA. Any LNA of LNA stage 405 receiving an input 430 amplifies that input 430 to generate an LNA output 435.

At mixer stage 410, any LNA outputs 435 are received at a transconductance gain stage buffer corresponding to the LNA that generated the LNA output 435. At any particular time, one of the transconductance gain stage buffers is activated to select one of the LNA outputs 435 for mixing. The LNA output 435 coupled to the activated transconductance gain stage buffer is mixed down with a signal from a local oscillator (LO) to generate one set of differential mixer outputs 440 and with the same signal offset by 90° to generate another set of differential mixer outputs 440 in quadrature.

Each of the two baseband filters in baseband filter stage 415 filters each set of differential mixer outputs 440 to generate a set of differential filtered outputs 445. Similarly, each of the two VGAs in VGA stage 420 amplifies or attenuates the differential filtered outputs 445 to generate differential amplifier outputs 450, and each of the two ADCs in ADC stage 425 converts differential amplifier outputs 450 into digital signals 455 for processing in the digital domain of receiver 400.

It will be understood that, even for this particular embodiment as illustrated in FIG. 5, variations may be provided without departing from the scope of the present disclosure. For example, as described in connection with FIG. 4, LNA stage 405 may comprise any suitable number of LNAs and mixer stage 410 may comprise any suitable number of mixer sets. In addition, baseband filter stage 415 may comprise any suitable number of baseband filters, VGA stage 420 may comprise any suitable number of VGAs, and ADC stage 425 may comprise any suitable number of ADCs.

Figure 6:
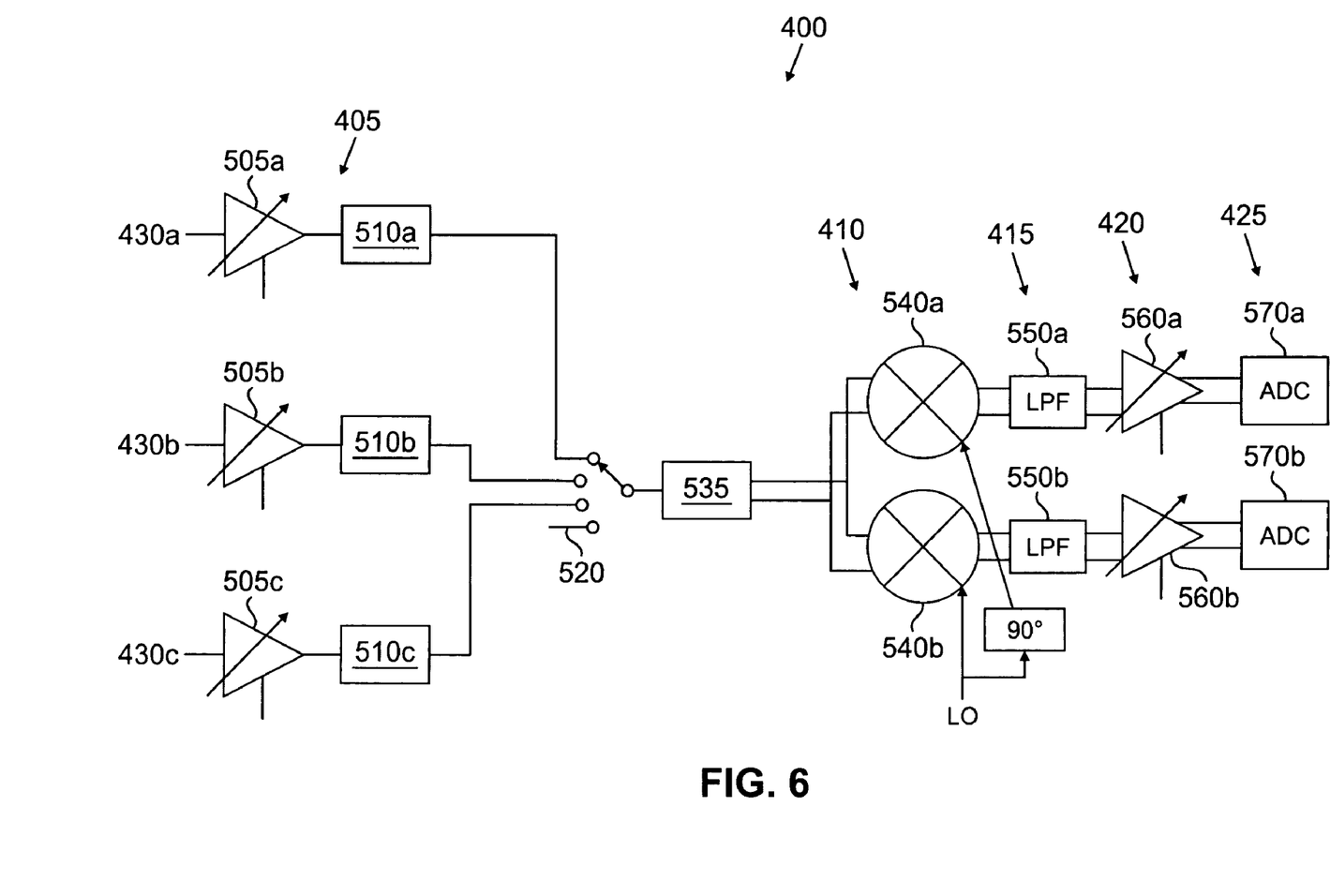
FIG. 6 illustrates details of the receiver of FIG. 4 according to another particular embodiment of the disclosure.

FIG. 6 illustrates details of receiver 400 according to another particular embodiment of the disclosure. For this particular embodiment, LNA stage 405 of receiver 400 comprises a 3-step gain control stage and mixer stage 410 comprises a single mixer set. The receiver 400 of FIG. 6 may be implemented in RF transceiver 250, as shown in base station 101 of FIG. 2, in RF transceiver 310, as shown in mobile station 111 of FIG. 3, or in any other suitable wireless device.

In order to support multi-band operation for WCDMA while minimizing PCB real estate and component count, a highly integrated RF ASIC solution that meets the 3GPP TS25.101 requirements is implemented. This puts a constraint on the number of external RF-SAW filters that may be used in a receiver. RF-SAW filters are commonly found in conventional designs for WCDMA handset receivers between an LNA and a mixer for each band. Thus, for example, a quad-band WCDMA receiver may implement four such external RF-SAW filters. Also, the conventional design approach of using a single-ended LNA output and a differential mixer input requires 12 pin-outs for accommodating the four filters. These additional pin counts also mean a larger RF ASIC package size.

The architecture depicted in FIG. 6 allows for the optimization of performance for reference sensitivity while meeting all blocker requirements in 3GPP TS25.101 by applying a combination of system design manipulation (which includes the addition of integrated analog variable gain blocks), an additional gain step for the LNA, and fixed integrated filtering.

The receiver 400 of FIG. 6 uses a 3-step gain control for LNA stage 405 that allows switching to mid-gain at certain blocker tests but that may achieve the maximum gain required to optimize receiver sensitivity. In this way, the LNA maximum gain may be designed higher for better overall receiver noise figure performance, which translates to better sensitivity. The $3^{rd}$ step gain is used when the signal input reaches very high levels so that the LNA can be bypassed to avoid saturating the back-end of the receiver 400 and to reduce power consumption.

In the design of an ASIC that supports tri-band WCDMA, three LNAs 505a-c are used to handle the three bands, shown as input 430a for 869-894 MHz, input 430b for 1930-1990 MHz, and input 430c for 2110-2170 MHz. These inputs 430 are coupled to the respective duplexers and switches of receiver 400, as known to those of skill in the art. As such, an integrated switch 520 may be used as shown in FIG. 6 to facilitate all the options.

The receiver 400 of FIG. 6 also uses fixed, integrated bandpass filters 510a-c centered at the various bands that can provide several dB of transmit band rejection after the corresponding LNA 505a-c. Receiver 400 also comprises a balun 535 for matching after switch 520. This receiver 400 may use at least a minimum performance of mixer set 540 that is commercially competitive, particularly in its linearity with an input third order intercept point (IP3) of 7 dBm or better. The conversion gain of mixer set 540 is less consequential as long as it has some power gain because, after analog baseband filtering at baseband filters 550a-b, an analog VGA stage 420 with VGAs 560a-b may provide up to 10 dB power gain with a dynamic range of approximately 25 dB.

VGA stage 420 also reduces the dynamic range requirement of the WCDMA ΣΔ ADCs 570a-b in ADC stage 425 after VGA stage 420. Integrated low-pass filtering may be used between VGA stage 420 and ADC stage 425, depending on the linearity of ADCs 570a-b. The analog VGA stage 420 also allows for the reduction of blocker effects, such as intermodulation products, at ADC stage 425 by attenuating at certain settings that are programmable. This embodiment of receiver 400 first reduces the analog VGA gain to a minimum before any adjustment is made at the digital VGA in the digital domain.

One particular feature of receiver 400 is the ability to meet 3GPP TS 25.101 requirements for a full division duplex (FDD) WCDMA receiver in Class I through Class VI without an external filter between LNA stage 405 and mixer stage 410. Integrated bandpass filters 510 with much lower selectivity requirements may be implemented between LNA stage 405 and mixer stage 410 instead. This technique at the same time optimizes the sensitivity performance of receiver 400.

For one embodiment, the following assumptions are made regarding competitive mixer performance:
1) conversion gain of approximately 3 dB (power gain),
2) double sideband (DSB) noise figure of approximately 8 dB,
3) input IP3 of approximately 7 dBm, and
4) input second order intercept point (IP2) of approximately 70 dBm (at input differential impedance of 200Ω for a direct-conversion I/Q mixer).

Various embodiments include a base station and mobile station, wherein the base station and mobile station each include a sufficiently linear operation in the low-noise amplifier, direct conversion mixer, variable gain amplifier, and analog-to-digital converter such that all transmitter leakage and interferer power can be removed in the ensuing digital baseband filter blocks and wherein the base station and mobile station have no additional analog baseband filters.

It will be understood that, even for this particular embodiment as illustrated in FIG. 6, other variations may be provided without departing from the scope of the present disclosure. For example, as described in connection with FIG. 4, LNA stage 405 may comprise any suitable number of LNAs with various gain steps and mixer stage 410 may comprise any suitable number of mixer sets. In addition, baseband filter stage 415 may comprise any suitable number of baseband filters, VGA stage 420 may comprise any suitable number of VGAs, and ADC stage 425 may comprise any suitable number of ADCs.

Although the present invention has been described with one embodiment, various changes and modifications may be suggested to one skilled in the art. It is intended that the present invention encompass such changes and modifications as fall within the scope of the appended claims.

What is claimed is:

1. A wireless receiver, comprising:
   at least two multi-step gain-control low-noise amplifiers (LNAs) configured to amplify at least two input signals to generate at least two LNA outputs; and
   at least two fixed frequency response filters coupled to corresponding LNA outputs and configured to generate at least two filtered outputs, the two fixed frequency response filters and the two LNAs integrally formed together on an integrated circuit; and
   at least two mixers directly coupled to corresponding LNAs, each mixer configured to down-convert its respective LNA output to generate a mixer output,
   wherein each LNA is configured to amplify a different band of input signals to generate its respective LNA output.

2. The wireless receiver as set forth in claim 1, the LNAs comprising a first LNA configured to amplify low-band input signals, a second LNA configured to amplify mid-band input signals, and a third LNA configured to amplify high-band input signals.

3. The wireless receiver as set forth in claim 2, the mixer comprising a first mixer set operable to down-convert the LNA output generated by the first LNA and a second mixer set operable to down-convert one of (i) the LNA output generated by the second LNA and (ii) the LNA output generated by the third LNA.

4. The wireless receiver as set forth in claim 1, the mixer comprising at least two mixer sets.

5. The wireless receiver as set forth in claim 1, further comprising a variable gain amplifier (VGA) stage coupled to the mixer and operable to generate an amplifier output based on the mixer output.

6. The wireless receiver as set forth in claim 5, further comprising a baseband filter stage coupled between the mixer and the VGA stage, the baseband filter operable to filter the mixer output to generate a filtered output, and the VGA stage operable to generate the amplifier output based on the mixer output by amplifying the filtered output.

7. The wireless receiver as set forth in claim 6, further comprising an analog-to-digital converter (ADC) stage coupled to the VGA stage, the ADC stage operable to convert the amplifier output from an analog signal into a digital signal.

8. The wireless receiver as set forth in claim 7, the baseband filter stage comprising two baseband filters, the VGA stage comprising two VGAs, and the ADC stage comprising two sigma-delta ADCs.

9. The wireless receiver as set forth in claim 7, the mixer comprising an input third order intercept point of about 7 dBm and an input second order intercept point of about 70 dBm, and the VGA stage comprising at least one VGA, each VGA of the VGA stage comprising a maximum gain of about 10 dB and a dynamic range of about 25 dB.

10. A mobile station for use in a wireless network, comprising:
    a transceiver comprising at least two multi-step gain-control low-noise amplifiers (LNAs), at least two fixed frequency response filters, and a mixer, each LNA configured to amplify at least one input signal to generate at least one LNA output, the at least two fixed frequency response filters coupled to corresponding LNA outputs and configured to generate at least two filtered outputs, and at least two mixers directly coupled to corresponding LNAs, each mixer operable to down-convert the one filtered output to generate a mixer output, the transceiver operable to generate a transceiver output based on the mixer output; and a receive processing circuit coupled to the transceiver, the receive processing circuit operable to process the transceiver output to generate a processed baseband signal for a speaker of the mobile station, wherein each LNA is configured to amplify a different band of input signals to generate its respective LNA output;

wherein the at least two LNAs and the at least two fixed frequency response filters are integrally formed together on an integrated circuit.

11. The mobile station as set forth in claim 10, the LNAs comprising a first LNA configured to amplify low-band input signals, a second LNA configured to amplify mid-band input signals, and a third LNA configured to amplify high-band input signals.

12. The mobile station as set forth in claim 11, the mixer comprising a first mixer set operable to down-convert the LNA output generated by the first LNA and a second mixer set operable to down-convert one of (i) the LNA output generated by the second LNA and (ii) the LNA output generated by the third LNA.

13. The mobile station as set forth in claim 10, the mixer comprising at least two mixer sets.

14. The mobile station as set forth in claim 10, the transceiver further comprising a variable gain amplifier (VGA) stage coupled to the mixer and operable to generate an amplifier output based on the mixer output.

15. The mobile station as set forth in claim 14, the transceiver further comprising a baseband filter stage and an analog-to-digital converter (ADC) stage, the baseband filter stage coupled between the mixer and the VGA stage and operable to filter the mixer output to generate a filtered output, the VGA stage operable to generate the amplifier output based on the mixer output by amplifying the filtered output, the ADC stage coupled to the VGA stage and operable to convert the amplifier output from an analog signal into a digital signal.

16. The mobile station as set forth in claim 15, the mixer comprising an input third order intercept point of about 7 dBm and an input second order intercept point of about 70 dBm, and the VGA stage comprising at least one VGA, each VGA of the VGA stage comprising a maximum gain of about 10 dB and a dynamic range of about 25 dB.

17. The mobile station as set forth in claim 10, the transceiver configured to operate in a wideband code division multiple access wireless network.

18. A base station for use in a wireless network, comprising a transceiver, the transceiver comprising:
at least two multi-step gain-control low-noise amplifiers (LNAs), each LNA operable to amplify at least one input signal to generate at least one LNA output;
at least two fixed frequency response filters coupled to corresponding LNA outputs and configured to generate at least two filtered outputs, the two fixed frequency response filters integrally formed with the LNAs on an integrated circuit; and
at least two mixers directly coupled to corresponding LNAs, each mixer configured to down-convert the one filtered output to generate a mixer output,
wherein the LNAs comprising at least two LNAs, each LNA configured to amplify a different band of input signals to generate the LNA output.

19. The base station as set forth in claim 18, the LNAs comprising a first LNA configured to amplify low-band input signals, a second LNA configured to amplify mid-band input signals, and a third LNA configured to amplify high-band input signals.

20. The base station as set forth in claim 19, the mixer stage comprising a first mixer set operable to down-convert the LNA output generated by the first LNA and a second mixer set operable to down-convert one of (i) the LNA output generated by the second LNA and (ii) the LNA output generated by the third LNA.

21. The base station as set forth in claim 18, the mixer comprising at least two mixer sets.

22. The base station as set forth in claim 18, the transceiver further comprising a variable gain amplifier (VGA) stage coupled to the mixer and operable to generate an amplifier output based on the mixer output.

23. The base station as set forth in claim 22, the transceiver further comprising a baseband filter stage and an analog-to-digital converter (ADC) stage, the baseband filter stage coupled between the mixer and the VGA stage and operable to filter the mixer output to generate a filtered output, the VGA stage operable to generate the amplifier output based on the mixer output by amplifying the filtered output, the ADC stage coupled to the VGA stage and operable to convert the amplifier output from an analog signal into a digital signal.

24. The base station as set forth in claim 23, the mixer comprising an input third order intercept point of about 7 dBm and an input second order intercept point of about 70 dBm, and the VGA stage comprising at least one VGA, each VGA of the VGA stage comprising a maximum gain of about 10 dB and a dynamic range of about 25 dB.

25. The base station as set forth in claim 18, the transceiver configured to operate in a wideband code division multiple access (WCDMA) wireless network.

\* \* \* \* \*